UNITED STATES PATENT OFFICE.

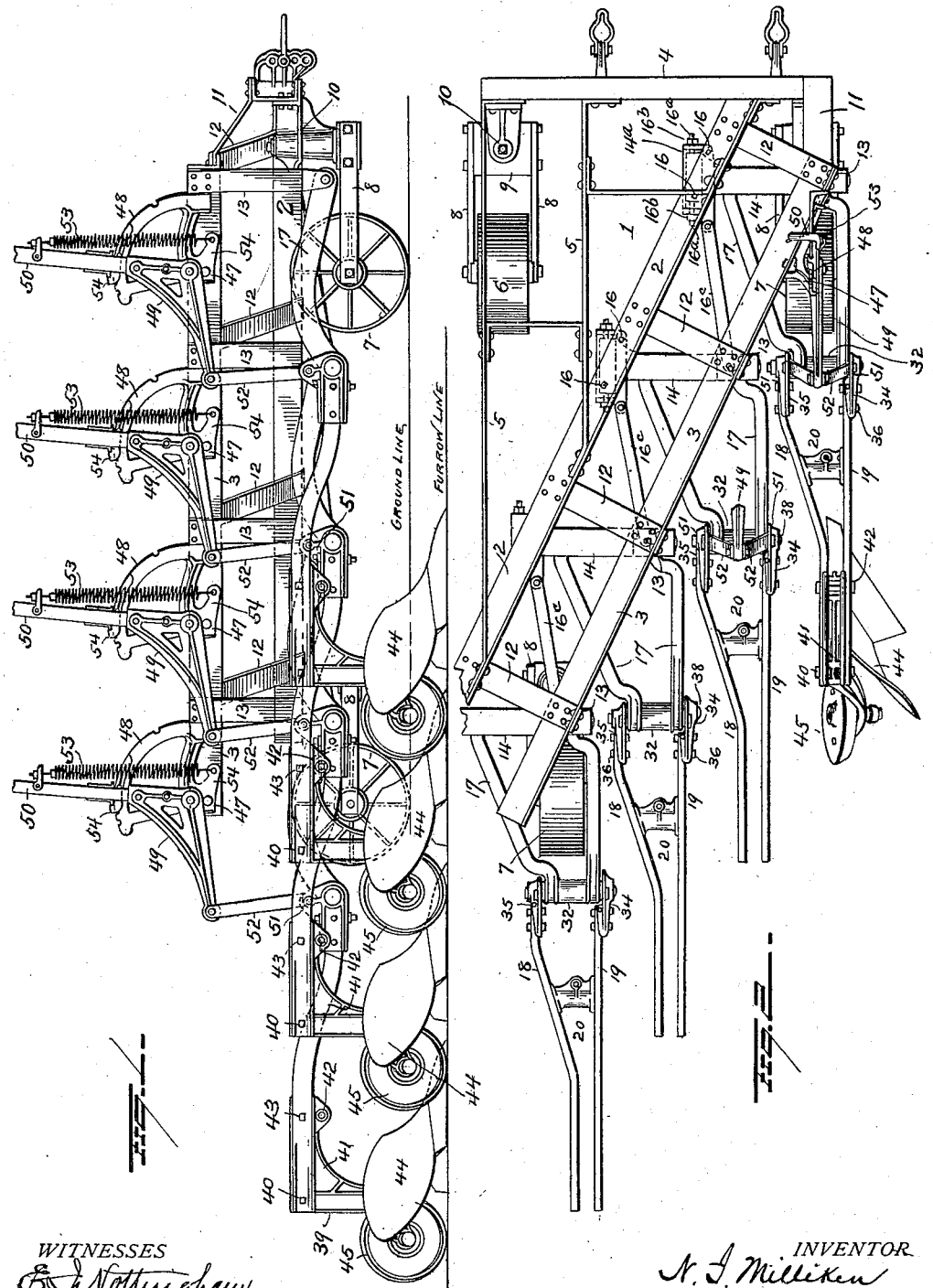

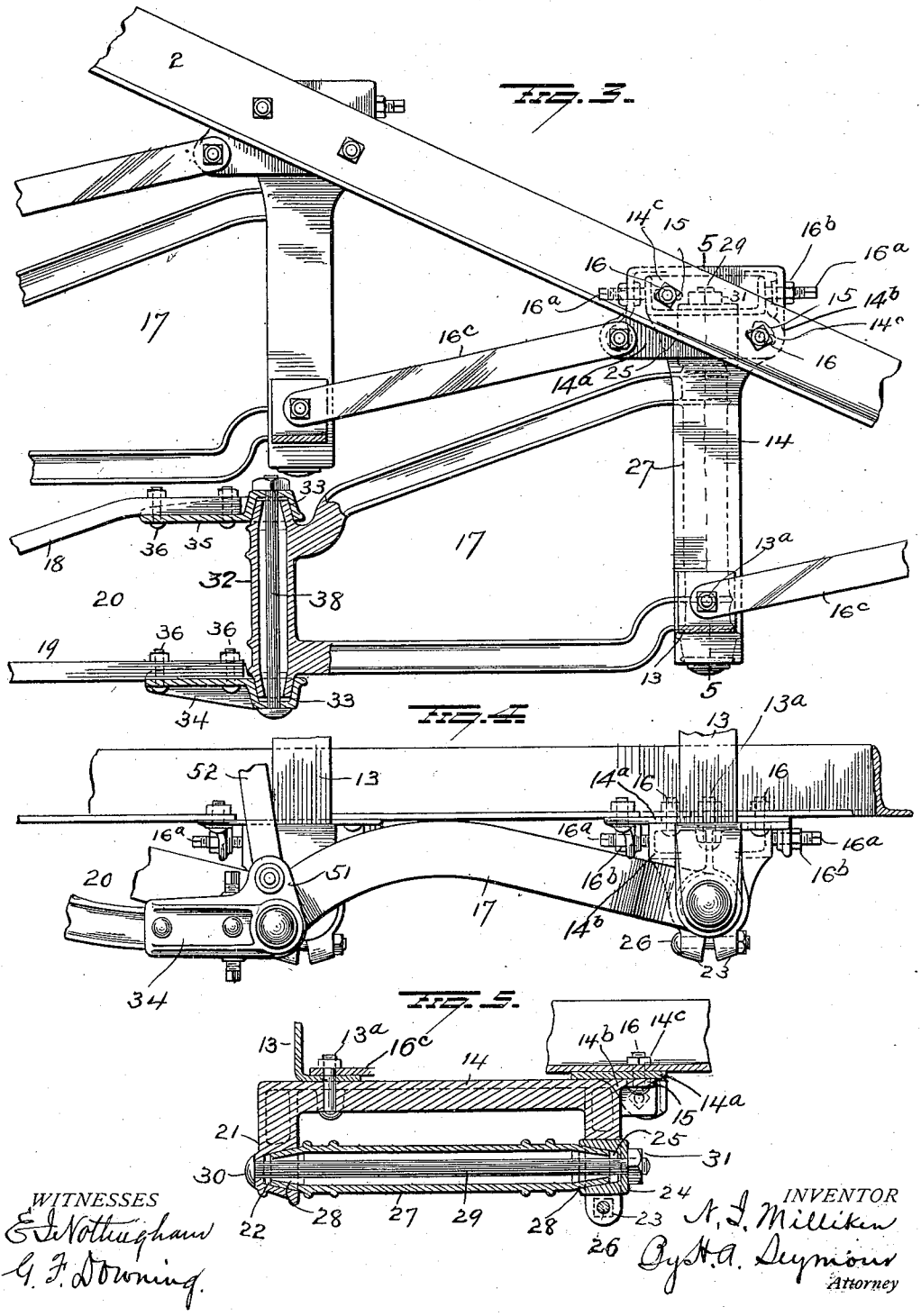

NORMAN I. MILLIKEN, OF SOUTH BEND, INDIANA, ASSIGNOR TO OLIVER CHILLED PLOW WORKS, OF SOUTH BEND, INDIANA.

ENGINE GANG-PLOW.

1,148,040.  Specification of Letters Patent.  Patented July 27, 1915.

Application filed January 3, 1914. Serial No. 810,209.

*To all whom it may concern:*

Be it known that I, NORMAN I. MILLIKEN, of South Bend, in the county of St. Joseph and State of Indiana, have invented certain new and useful Improvements in Engine Gang-Plows; and I do hereby declare the following to be a full, clear, and exact description of the invention, such as will enable others skilled in the art to which it appertains to make and use the same.

This invention relates to improvements in plows and more particularly to engine gang plows,—one object of the invention being to provide a structure in which a single lever may be utilized to raise or lower a plow unit; to adjust the suction of the plow body; to regulate the depth of plowing, or to force the plow body into the ground.

A further object is to so construct an engine gang plow that friction between the parts shall be reduced to a minimum and so that the draft of the plow shall be light.

With these and other objects in view, the invention consists in certain novel features of construction and combinations of parts as hereinafter set forth and pointed out in the claims.

In the accompanying drawings; Figure 1 is a side elevation of an engine gang plow embodying my improvements; Fig. 2 is a plan view; Fig. 3 is an enlarged plan view showing one of the bails and the manner of connecting the same with the truck frame and the plow beam members; Fig. 4 is a side view of the structure shown in Fig. 2, and Fig. 5 is a sectional view on the line 5—5 of Fig. 3.

1 represents a truck frame, comprising diagonally disposed rear beams 2—3; a front beam 4, and braces 5 connecting the draft beam 4 with the beam 2. The triangular truck frame is supported in proximity to its corners by trailing wheels 6, 7. These wheels are journaled between arms 8, the forward ends of which are secured to heads 9 and suitable mountings 10 are provided for the latter on the truck frame, so as to permit the wheels 6, 7 to caster. The rear diagonal beams 2, 3 are disposed in different vertical and horizontal planes. That is to say, the beam 3 is located rearwardly of the beam 2 and in a plane above that of the latter. The beam 2 is secured at its forward end to the draft beam 4 by means of a suitable angle iron 11, and said beam 2 is connected with the upper beam 2 by means of inclined brace bars 12. At the rear upper ends of the brace bars 12 depending bars 13 are secured at their upper ends to the beam 2, and the lower ends of said depending bars serve to pivotally support by means of bolts 13ª the rear ends of horizontal bars 14.

The bars 14 are disposed parallel with each other and parallel with the draft beam 4, and the left hand end of each of said horizontal bars is connected with the lower beam 2 of the truck frame through the medium of a flanged bracket 14ª. Each bar 14 is provided at its forward end with a head 14ᵇ disposed within the bracket 14ª, and said head is made with elongated openings 15, through which bolts 16 pass,—said bolts also passing through holes in the bracket 14ª and the truck beam 2, and provided at one end with a nut 14ᶜ. Set screws 16ª pass through parallel flanges of each bracket 14ª and engage the head 14ᵇ of the adjacent bar 14, at diametrically opposite points, for the purpose of turning said bar on its pivotal support at 13ª and adjusting the bar in such manner as to aline the plow connected therewith (as hereinafter described) relatively to the adjacent plows of the gang. Jam nuts 16ᵇ are provided to secure the set screws at any desired adjustment.

A brace bar 16ᶜ is secured at its forward end to each bracket 14ª and at the other end to the pivot bolt 13ª near one end of the bar 14 rearwardly of the bracket with which the forward end of said brace is connected.

A bail 17 is pivotally connected with each bar 14, and with the rear end of each bail the forward ends of the members 18, 19 of a plow beam 20 are connected,—said connections being effected in a manner which will now be explained.

Each bar 14 is provided at one end with a lug 21 having a conical socket 22 therein, and at the other end each bar 14 is provided with spaced lugs 23 which coöperate to form a split bearing or clamp for a block 24 having a conical socket 25 therein. The clamping lugs 23 are perforated for the accommodation of a bolt 26 by means of which the clamping lugs may be tightened on the block 24. The members of the bail 17 are connected at their forward ends by an integral sleeve 27, the respective ends of which are made conical as at 28 and have bearings in the conical sockets 22 and 25. A rod 29 passes through the sleeve 27, the lug 21 and the bearing block 24,—one end of said rod having a head 30 and the other end being threaded for the reception of a nut 31.

By means of the devices above described, the bails 17 are pivotally connected with the truck frame, such pivotal mounting being at right angles to the line of draft of the plow. It is apparent that the bearing block 24 may be readily adjusted to compensate for wear of the pivotal connection of the bail to the truck frame.

The members of each bail 17 are disposed at an angle to each other so that said bail has a general triangular shape, the rear ends of the bail members approaching each other more nearly than the forward ends. The rear ends of the bail members are connected by an integral sleeve 32, the ends of which project laterally beyond said bail members and are made conical. The conical ends of the sleeve 32 are mounted in conical sockets 33, at the forward ends of arms 34—35. These arms are flanged and receive the forward ends of the plow beam members 18, 19, to which they are secured by bolts 36. A rod 38 passes through the sleeve 32, and the socketed ends 33 of the arms 34—35, one end of said rod being provided with a head to bear against the socketed end of the arm 34 and the other end of said rod being threaded to receive a nut which bears against the socketed end of the other arm 35. By means of the devices above described, the forward ends of the members of each plow beam are pivotally connected with the rear end of one of the pivoted bails 17.

The plow beam members are so constructed that their rear ends are parallel with each other and receive between them, the upper end of a plow standard 39 which may be connected with said beam members by a bolt 40. The standard is made with a forwardly projecting portion 41 connected with the beam through the medium of a break pin 42,—or, if the ground is soft and free from obstructions, the forwardly projecting portion 41 of the beam may be secured fixedly to the beam by means of a bolt 43.

Each standard carries a plow body 44, and in rear of the latter a wheel or revolving landside 45 is mounted on the standard. This wheel takes care of the resistance of the mold board and relieves the landside of the plow body from pressure against the wall of the furrow. These wheels also act as carriers, when the plow bodies are raised from the ground and during transportation of the plow either at the end of a field or on the road.

It will be observed that the two rear caster wheels of the truck frame are embraced by the bails 17 at the ends of the truck frame. The two rear wheels 7 therefore become practically rigid when the plows are in the ground, because the bail members will be disposed at respective sides of each of said wheels and restrict the castering of the same, thus facilitating the steady running of the plow and reducing its side motion to a minimum.

A plurality of brackets 47, corresponding in number to the number of plow units employed, are secured to the rear truck frame beam 3 and provided with toothed segments 48. A bell-crank lever 49 is pivotally attached at its apex to each bracket 48, and to the upwardly projecting arm of each bell-crank, a hand operating lever 50 is secured and provided with a detent to engage the adjacent toothed segment.

The arms 34, 35 (which connect the plow beam members with the bail 17) are provided with upward projections 51, to which the lower ends of links 52 are pivotally connected. The links 52 of each pair converge at their upper ends and are pivotally connected with the rearwardly projecting arm of one of the bell-cranks 49. By this construction, the rear end of the bail and forward end of the plow beam will be so supported as to resist any twisting which might tend to result from the plow body striking an obstruction. The pivotal connections between the links 52 and the lever 49 and arms 34—35, may be conveniently effected by conical bearings similar to the connections between the arms 34—35 and bail 17.

A spring 53 is connected at one end to each lever 50 and at the other end to an arm 54 on the fixed bracket 47, said spring being located in such position as to take care of the downward pressure on the front end of the beam while the lever is not locked.

With the construction and arrangement of mechanism herein described, I am enabled, by means of the hand lever and its connections with the plow beam and bail, to so tilt the plow body as to accurately adjust the same for suction, and this adjustment may be fixed or regulated for each of the several plow units, by means of adjustable stops 54 mounted on the toothed segments 48 in position to be engaged by the hand levers.

The levers 50 may also be manipulated to raise or lower the plow bodies, or to adjust the same for depth of plowing or to force the plow body into the ground,—the forward ends of the plow beams being raised and the revolving landsides constituting rolling fulcrums in each instance. Furthermore, the plow bodies may be raised entirely out of the ground, when the revolving landsides or wheels 45 will act as carriers to facilitate the transportation of the entire plow structure from the end of a field or over a roadway.

I do not in this case claim broadly a connection between a hand lever on a truck frame and the rear portion of the trailing bail with which latter, the forward end of the plow beam is pivotally connected.

Various changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. In a gang plow, the combination with a traveling frame, a plow beam and a plow body attached to said beam, of a bail having a pivotal connection at its forward end with said frame and having pivotal connection at its rear end with the forward end of the plow beam, an operating lever on the frame, and a rigid link pivotally connected with the lever and with the pivotal connection between the bail and beam, and constituting with the lever the suspending and raising means for the beam.

2. In a gang plow, the combination with a traveling frame, a plow beam and a plow body, of a horizontal bar secured to the frame at right angles to the line of draft, conical bearings at respective ends of said bar, means for adjustably securing one of said bearings in place, a bail provided at its forward end with conical journals mounted in said conical bearings, means pivotally connecting the rear end of said bail with the forward end of the plow beam, a lever on the frame and means connecting said lever with the forward end of the beam.

3. In a gang plow, the combination with a traveling frame, a plow beam comprising two members, and a plow body, of a bail pivotally connected with the frame, said bail provided at its rear end with conical journals, arms secured to the beam members and having sockets to receive said journals, means holding the socketed portions of the arms on the journals on the bails, a lever on the frame and means connecting said lever with the forward end of the beam.

4. In a gang plow, the combination with a traveling frame, a plow beam and a plow body, of a bail, means constituting an adjustable connection for the forward end of said bail to the frame, means constituting a pivotal connection of the rear end of the bail with the forward end of the beam, a lifting lever on the frame, means connecting said lever with the forward end of the beam, and means connecting the plow body with the beam.

5. In a gang plow, the combination with a traveling frame and a plow beam, of a bail pivotally connected with the forward end of the beam, means pivotally connecting the forward end of the bail with the traveling frame, and means for adjusting said last-mentioned means horizontally.

6. In a gang plow the combination with a traveling frame and a plow beam, of a bail pivotally connected with the forward end of the plow beam, a bar connected with the traveling frame, means effecting pivotal connection of the forward end of the bail with said bar, and means coöperating with said bar for adjusting the same horizontally in a forward or backward direction.

7. In a gang plow, the combination with a traveling frame and a plow beam, of a bail pivotally connected with the forward end of the plow beam, a horizontal bar pivotally connected with the traveling frame, means for movably connecting a part of the bar with the traveling frame, means pivotally connecting the forward end of the bail with said bar, and means for adjusting the said bar forwardly or backwardly on its pivotal connection with the truck frame.

In testimony whereof, I have signed this specification in the presence of two subscribing witnesses.

NORMAN I. MILLIKEN.

Witnesses:
EDWIN NICAR,
H. GAIL DAVIS.

Copies of this patent may be obtained for five cents each, by addressing the "Commissioner of Patents, Washington, D. C."